United States Patent
O'Brien et al.

(10) Patent No.: US 8,127,145 B2
(45) Date of Patent: Feb. 28, 2012

(54) COMPUTER ARCHITECTURE FOR AN ELECTRONIC DEVICE PROVIDING A SECURE FILE SYSTEM

(75) Inventors: Terence W. O'Brien, Webster, NY (US); Richard Schmalbach, Timonium, NY (US); John Blessing, Eldersburg, MD (US); Jeffrey L. Murray, Penfield, NY (US)

(73) Assignee: Harris Corporation, Melbourne, FL (US)

( * ) Notice: Subject to any disclaimer, the term of this patent is extended or adjusted under 35 U.S.C. 154(b) by 986 days.

(21) Appl. No.: 11/387,342

(22) Filed: Mar. 23, 2006

(65) Prior Publication Data

US 2007/0226517 A1 Sep. 27, 2007

(51) Int. Cl.
*G06F 21/00* (2006.01)
(52) U.S. Cl. .......................... 713/189; 726/26
(58) Field of Classification Search .............. 713/189, 713/193; 726/26
See application file for complete search history.

(56) References Cited

U.S. PATENT DOCUMENTS

| | | | |
|---|---|---|---|
| 4,227,253 A | 10/1980 | Ehrsam et al. | |
| 4,493,031 A | 1/1985 | Silverio | |
| 4,918,728 A | 4/1990 | Matyas et al. | |
| 5,263,168 A | 11/1993 | Toms et al. | |
| 5,283,828 A | 2/1994 | Saunders et al. | |
| 5,369,702 A * | 11/1994 | Shanton | 713/166 |
| 5,548,646 A * | 8/1996 | Aziz et al. | 713/153 |
| 5,596,718 A * | 1/1997 | Boebert et al. | 726/16 |
| 5,748,744 A | 5/1998 | Levy et al. | |
| 5,802,178 A * | 9/1998 | Holden et al. | 713/151 |
| 5,887,064 A | 3/1999 | Seysen | |
| 5,956,404 A | 9/1999 | Schneier et al. | |
| 6,081,895 A | 6/2000 | Harrison et al. | |
| 6,092,202 A | 7/2000 | Veil et al. | |
| 6,148,401 A * | 11/2000 | Devanbu et al. | 713/170 |
| 6,282,653 B1 * | 8/2001 | Berstis et al. | 726/26 |
| 6,378,071 B1 | 4/2002 | Sasaki et al. | |
| 6,378,072 B1 | 4/2002 | Collins et al. | |
| 6,671,804 B1 | 12/2003 | Kent | |
| 6,775,778 B1 | 8/2004 | Laczko, Sr. et al. | |
| 7,003,674 B1 | 2/2006 | Hamlin | |
| 7,028,149 B2 | 4/2006 | Grawrock et al. | |

(Continued)

FOREIGN PATENT DOCUMENTS

DE 196 33 919 6/1997

(Continued)

OTHER PUBLICATIONS

Schneier, Applied Cryptography Second Edition, 1996, John Wiley & Sons, Second Edition, pp. 513-514.*

(Continued)

*Primary Examiner* — Edan Orgad
*Assistant Examiner* — Brian Olion
(74) *Attorney, Agent, or Firm* — Fox Rothschild, LLP; Robert J. Sacco (57) ABSTRACT

A secure file service includes a cryptographic processor (302, 602) and a secure file system (301, 601). The cryptographic processor is comprised of a trusted microprocessor and a trusted operating system executing on the trusted cryptographic processor. The cryptographic processor includes hardware and software for accessing at least one classified data file from the secure file system, decrypting the classified data file, and serving the classified data file in decrypted form to a secure user processor (402, 502, 702) that has requested the file. The secure file system can be either a single-level secure file system (301) or a multi-level secure file system (601).

31 Claims, 7 Drawing Sheets

U.S. PATENT DOCUMENTS

| | | | |
|---|---|---|---|
| 7,047,405 B2 | 5/2006 | Mauro | |
| 7,069,447 B1* | 6/2006 | Corder | 713/189 |
| 7,072,937 B2 | 7/2006 | Neebe et al. | |
| 7,185,249 B2 | 2/2007 | Tkacik et al. | |
| 7,210,009 B2 | 4/2007 | Gulick et al. | |
| 7,290,288 B2 | 10/2007 | Gregg et al. | |
| 7,302,698 B1 | 11/2007 | Proudler et al. | |
| 7,322,042 B2 | 1/2008 | Srinivasan et al. | |
| 7,380,275 B2 | 5/2008 | Srinivasan et al. | |
| 7,496,347 B2 | 2/2009 | Puranik | |
| 7,543,144 B2 | 6/2009 | Rensin et al. | |
| 7,698,552 B2 | 4/2010 | Wilson et al. | |
| 7,765,399 B2 | 7/2010 | O'Brien | |
| 7,779,252 B2 | 8/2010 | O'Brien et al. | |
| 7,818,574 B2 | 10/2010 | Fayad et al. | |
| 7,979,714 B2 | 7/2011 | Borsa et al. | |
| 8,041,947 B2 | 10/2011 | O'Brien et al. | |
| 8,060,744 B2 | 11/2011 | O'Brien et al. | |
| 2001/0044886 A1* | 11/2001 | Cassagnol et al. | 711/163 |
| 2002/0059238 A1* | 5/2002 | Saito | 707/9 |
| 2002/0099950 A1 | 7/2002 | Smith | |
| 2003/0046589 A1* | 3/2003 | Gregg | 713/201 |
| 2003/0126434 A1 | 7/2003 | Lim et al. | |
| 2003/0163740 A1* | 8/2003 | Thjai et al. | 713/202 |
| 2004/0039924 A1 | 2/2004 | Baldwin et al. | |
| 2004/0044902 A1 | 3/2004 | Luthi | |
| 2004/0103288 A1 | 5/2004 | Ziv et al. | |
| 2005/0114687 A1 | 5/2005 | Zimmer et al. | |
| 2005/0132186 A1 | 6/2005 | Khan et al. | |
| 2006/0021007 A1 | 1/2006 | Rensin et al. | |
| 2006/0041755 A1 | 2/2006 | Pemmaraju | |
| 2006/0078109 A1 | 4/2006 | Akashika et al. | |
| 2006/0195907 A1 | 8/2006 | Delfs et al. | |
| 2006/0248599 A1* | 11/2006 | Sack et al. | 726/27 |
| 2006/0251258 A1 | 11/2006 | Lillie et al. | |
| 2006/0253711 A1 | 11/2006 | Kallmann | |
| 2007/0214364 A1 | 9/2007 | Roberts | |
| 2007/0226493 A1* | 9/2007 | O'Brien et al. | 713/166 |
| 2007/0226494 A1* | 9/2007 | O'Brien et al. | 713/166 |
| 2007/0250411 A1 | 10/2007 | Williams | |
| 2007/0283159 A1 | 12/2007 | Borsa et al. | |
| 2008/0022136 A1 | 1/2008 | Mattsson et al. | |
| 2009/0150899 A1* | 6/2009 | Tahan | 718/106 |

FOREIGN PATENT DOCUMENTS

| | | |
|---|---|---|
| EP | 0 471 538 | 2/1992 |
| EP | 0657 820 | 6/1995 |
| EP | 1 085 396 | 3/2001 |
| GB | 233 6005 | 10/1999 |
| WO | WO 98/39876 * | 3/1998 |

OTHER PUBLICATIONS

Wiki: "Multilevel Security" Wikipedia, [Online] Mar. 21, 2006, XP00246615 Internet Retrieved from the Internet: URL:http://en.wikiedia.org/w/index.php?title=Multilevel_security&oldid=44733265> [retrieved on Aug. 13, 2007].

U.S. Appl. No. 11/359,224, filed Feb. 22, 2006, Computer Architecture for a Handheld Electronic Device.

U.S. Appl. No. 11/385,063, filed Mar. 21, 2006, Computer Architecture for a Handheld Electronic Device with a Shared Human-Machine Interface.

U.S. Appl. No. 11/387,342, filed Mar. 23, 2006, Computer Architecture for an Electronic Device Providing a Secure File System.

U.S. Appl. No. 11/387,991, filed Mar. 23, 2006, Computer Architecture for an Electronic Device Providing Single-Level Secure Access to Multi-Level Secure File System.

U.S. Appl. No. 11/387,744, filed Mar. 23, 2006, Computer Architecture for an Electronic Device Providing SLS Access to MLS File System With Trusted Loading and Protection of Program Execution Memory.

U.S. Appl. No. 11/445,571, filed Jun. 2, 2006, Authentication and Access Control Device.

Extended European Search Report mailed Jul. 13, 2011; Application Serial No. 11003076.4 -2212 in the name of Harris Corporation.

Meadows C Ed—Institute of Electrical and Electronics Engineers: "Extending the Brewer-Nash model to a multilevel context", Proceedings of the Symposium on Research in Security and Privacy. Oakland, May 7-9, 1990; [Proceedings of the Symposium on Research in Security and Privacy],Los Alamitos, IEEE Comp. Soc. Press, US, vol. SYMP. 11, May 7, 1990, pp. 95-102, XP010020190, DOI: DOI:10.1109/RISP.1990.63842 ISBN: 978-0-8186-2060-7.

Brewer D F C et al: "The Chinese Wall security policy", Proceedings of the Symposium on Security and Privacy. Oakland, May 1-3, 1989; [Proceedings of the Symposium on Security and Privacy], Washington, IEEE Comp. Soc. Press, US, vol.-, May 1, 1989, pp. 206-214, XP010016022, DOI: DOI:10.1109/SECPRI.1989.36295 ISBN: 978-0-8186-1939-7.

Fraser T: "LOMAC: Low Water-Mark integrity protection for COTS environments", Security and Privacy, 2000. S&P 2000. Proceedings. 2000 IEEE Symposium On Berkeley, CA, USA May 14-17, 2000, Los Alamitos, CA, USA,IEEE Comput. Soc, US, May 14, 2000, pp. 230-245, XP010501138, DOI:DOI:10.1109/SECPRI.2000.848460 ISBN: 978-0-7695-0665-4.

Information about Related Patents and Patent Applications, see section 6 of the accompanying Information Disclosure Statement Letter, which concerns Related Patents and Patent Applications.

* cited by examiner

COMPUTER ARCHITECTURE FOR AN ELECTRONIC DEVICE PROVIDING A SECURE FILE SYSTEM

BACKGROUND OF THE INVENTION

1. Statement of the Technical Field

The inventive arrangements relate to electronic devices for storing and accessing sensitive/classified data.

2. Description of the Related Art

Electronic computers have the ability to store and process data. Computers typically include some kind of microprocessor with a commercially available operating system such as Linux, Unix, or Microsoft Windows. Many computers also have displays and keyboards for the human/machine interface. The foregoing capabilities make these devices highly useful for a various business and personal applications.

Currently, there exist a wide variety of computing devices with conventional operating systems and architectures. These commercially available computers with commercial-off-the-shelf (COTS) operating systems and COTS application programs generally satisfy the processing and data storage requirements of most users. For example, they include applications for word processing, data storage, spreadsheets, time management, and contact management. These applications generally function quite well and have interfaces that are familiar to many users.

Some commercially available computing devices and/or software applications incorporate various security measures in an effort to protect data which is stored or processed using the device. For example, encryption technology and password protection features are known in the art. Still, this level of security can be inadequate for managing information that is of a Confidential, Secret, or Top Secret nature, particularly when such information relates to matters of national security. For example, COTS operating systems and applications may not be sufficiently trustworthy for handling this type of information. Such programs can be susceptible to being compromised by various means including hacker attacks, viruses, worms, Trojan horses, and a wide variety of other means that are known to those skilled in the art.

Finally, notwithstanding the security limitations of COTS operating systems and applications, the basic architecture and interface systems of many commercial computing devices may leave these devices vulnerable to intrusion. For example, COTS devices do not employ trusted microprocessors, do not employ physical separation of classified and unclassified data processing, nor do they employ physical tamper detection and subsequent memory zeroization. Consequently, transport or processing of classified data using a commercial computer is not generally permitted.

Trusted operating systems and applications are generally designed to more rigorously address the problem of computer security. Trusted operating systems undergo evaluation of their overall design, verification of the integrity and reliability of their source code, and systematic, independent penetration evaluation. In contrast, non-trusted operating systems are generally not designed to an equally high level with regard to security precautions.

Single-level secure (SLS) is a class of systems that contain information with a single sensitivity (classification). SLS systems permit access by a user to data at a single sensitivity level without compromising data. Thus, SLS data file systems allow information at a single classification to be stored in an information system. The level of access can be limited by the current user security classification sign-on level and a security classification assigned to the secure user processor.

Multi-level secure (MLS) is a class of systems that contain information with different sensitivities (classifications). MLS systems permit simultaneous access by a user to data at multiple classification levels without compromising security. Thus, MLS data file systems allow information with different classifications to be stored in an information system. These systems are also designed to provide a user with the ability to process information in the same system. Significantly, however, these systems prevent a user from accessing information for which he is not cleared, does not have proper authorization, or does not have a need-to-know.

Users of non-trusted COTS operating systems, as may be found in commercial computers, are not generally allowed access to classified data found in secure file systems. Computers that utilize a trusted operating system (OS) which includes support for an SLS or MLS file system have been developed that are specifically designed to allow for storage of classified data. However, these devices are not generally designed to physically secure the data and zeroize the data upon tamper detection. Nor are they designed to be embedded as a secure component of a host computer system.

SUMMARY OF THE INVENTION

The invention concerns a system for providing a secure file service. The system includes a cryptographic processor and a secure file system. The cryptographic processor is comprised of a trusted microprocessor and a trusted operating system executing on the trusted microprocessor. The cryptographic processor can include one or more hardware based encryption services that facilitate the encryption and decryption of classified data files. For example, the hardware encryption services can include a hardware implemented cryptographic algorithm, a random number generator, and/or an exponentiator. The cryptographic processor includes processing facilities for encrypting and decrypting classified data files. The cryptographic processor also includes suitable hardware and software for accessing at least one classified data file from the secure file system, decrypting the data file, and serving the data file in decrypted form to a secure user processor that has requested the file.

The secure user processor is comprised of trusted microprocessor hardware. Notably, however, the secure user processor utilized in an SLS system can make use of either a trusted operating system or a non-trusted operating system while the secure user processor utilized in an MLS system must still make use of a multi-level-trusted operating system. A trusted path can be provided to define a data communication link between the secure user processor and the cryptographic processor. A secure human/machine interface can also be provided. The secure human/machine interface can be operatively connected to the secure user processor. For example, the secure human/machine interface can be configured for communicating user commands to the secure user processor and for displaying classified data files. The secure human/machine interface can also be operationally connected to the cryptographic processor. For example, the secure human/machine interface can be configured for communication user authentication information to the cryptographic processor and for displaying the results of user sign-on operations.

The secure user processor can also include hardware or software processing means for communicating the classified data file from the secure user processor to the cryptographic processor. The cryptographic processor has hardware and/or software processing facilities for encrypting the classified data file, for accessing the secure file system with the cryptographic processor, and for storing the classified data file after encryption in the secure file system. The secure file system can be either a single-level secure file system or a multi-level secure file system.

In addition to the encrypted classified data files stored in the secure file system hosted by the cryptographic processor, the secure file system can be used to store non-encrypted unclassified data. The cryptographic processor can include suitable hardware and/or software processing facilities for accessing the unclassified data file, system responsive to a request from the secure user processor. The cryptographic processor can also include processing means for serving the unclassified data files to the secure user processor.

The cryptographic processor can also include hardware and/or software processing facilities that can be used for authenticating a user. For example, such authentication can be performed responsive to user authentication information.

The invention also concerns a method for authenticating a user to the cryptographic processor before any data files are served to the secure user processor. The authentication can be performed by communicating at least one type of user authentication information to the cryptographic processor.

The method can also include the step of receiving at a cryptographic processor a request from a secure user processor for a non-encrypted unclassified data file. In response to the request, the cryptographic processor can access a secure file system containing the non-encrypted unclassified data file. Thereafter, the cryptographic processor can serve the unclassified data file to the secure user processor.

DETAILED DESCRIPTION OF THE PREFERRED EMBODIMENTS

Figure 1:
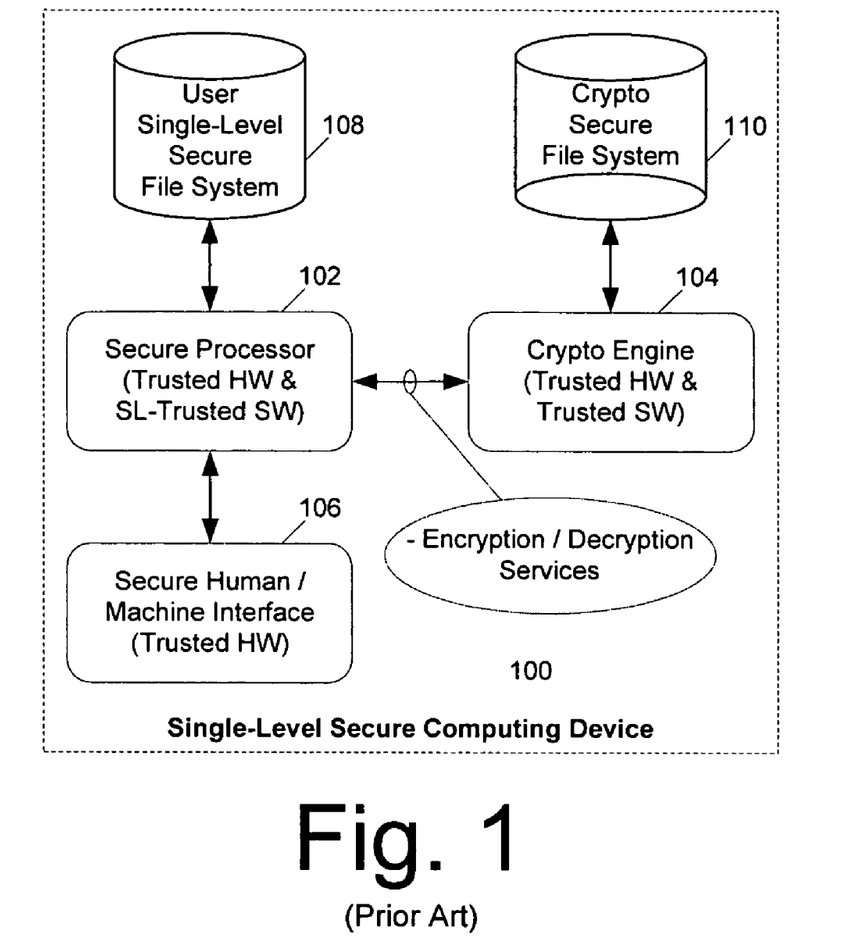
FIG. 1 is a block diagram of a single-level secure computing device of the prior art.

A block diagram of a single-level secure (SLS) computing device 100 is shown in FIG. 1. The SLS computing device 100 can include a secure user processor 102 that includes trusted hardware and single-level trusted software (operating system and application software). As used herein, the term "trusted" is used with reference to computer hardware, operating systems, and/or software applications that have been designed to ensure secure storage, processing and communication of data. Trusted hardware and trusted software can be combined to provide secure data processing. Trusted hardware and software are generally designed and tested to ensure the integrity and reliability of their source code, and their resistance to penetration. In contrast, non-trusted hardware and non-trusted software are generally not designed to an equally high level with regard to security precautions. Accordingly, when integrated into a computer system, those systems are often referred to as non-secure. Commercial-off-the-shelf (COTS) hardware and software is generally not "trusted."

The computing device 100 also includes a user SLS file system 108 in a data store that is used for storing user executable programs and data. Classified data stored in the SLS file system 108 is stored in an encrypted format. A cryptographic engine 104 is provided with trusted hardware and trusted software for providing encryption and decryption services. A crypto file system 110 is also maintained in a data store. The crypto file system 110 is used to store classified data and files used by the cryptographic engine 104. In contrast to the user SLS file system 108, user data and applications are not generally stored in the crypto file system 110. Instead, the crypto file system 110 generally contains cryptographic algorithms, security keys and certificates, audit data, policy profiles, and application data specific to the processing performed by the cryptographic engine 104.

A secure human/machine interface (HMI) 106 is also provided for the SLS computing device 100. The secure HMI 106 can be comprised of trusted hardware and can provide a trusted path to applications executing on secure processor 102. Consequently, secure HMI 106 can prevent invasive or unauthorized applications from monitoring user inputs and system outputs. Secure HMI devices are known in the art and typically can include one or more features to ensure trusted communications between the user and the secure user processor. For example, the secure HMI 106 can provide a suitable interface by which a user can enter data and commands to the computing device 100. Secure HMI 106 can also include a user display for showing data and information processed by the computing device 100.

A user can request access to a classified data file using the secure HMI 106. Encrypted files in the user SLS files system 108 are accessed by the secure user processor 102 and provided to the cryptographic engine 104 for decryption. After the file has been decrypted, the cryptographic engine passes the decrypted file back to the secure user processor 102. Upon completion of any necessary user processing associated with the decrypted classified date file, the secure user processor 102 passes the file back to the cryptographic engine 104 for re-encryption. Thereafter, the encrypted file is returned to the secure user processor 102, which stores the file in the user SLS file system 108.

Notably, the secure user processor 102 can generally satisfy the security requirements for accessing the single-level secure file system 108. However, the operating system and applications can be expensive as compared to COTS systems. In particular, the secure user processor must be developed specifically to include trusted software for managing secure files, and especially for managing encryption and decryption services provided by the cryptographic processor. Another disadvantage of this arrangement is that the user single-level secure file system is not generally designed to physically secure the data and zeroize the data upon tamper detection.

Figure 2:
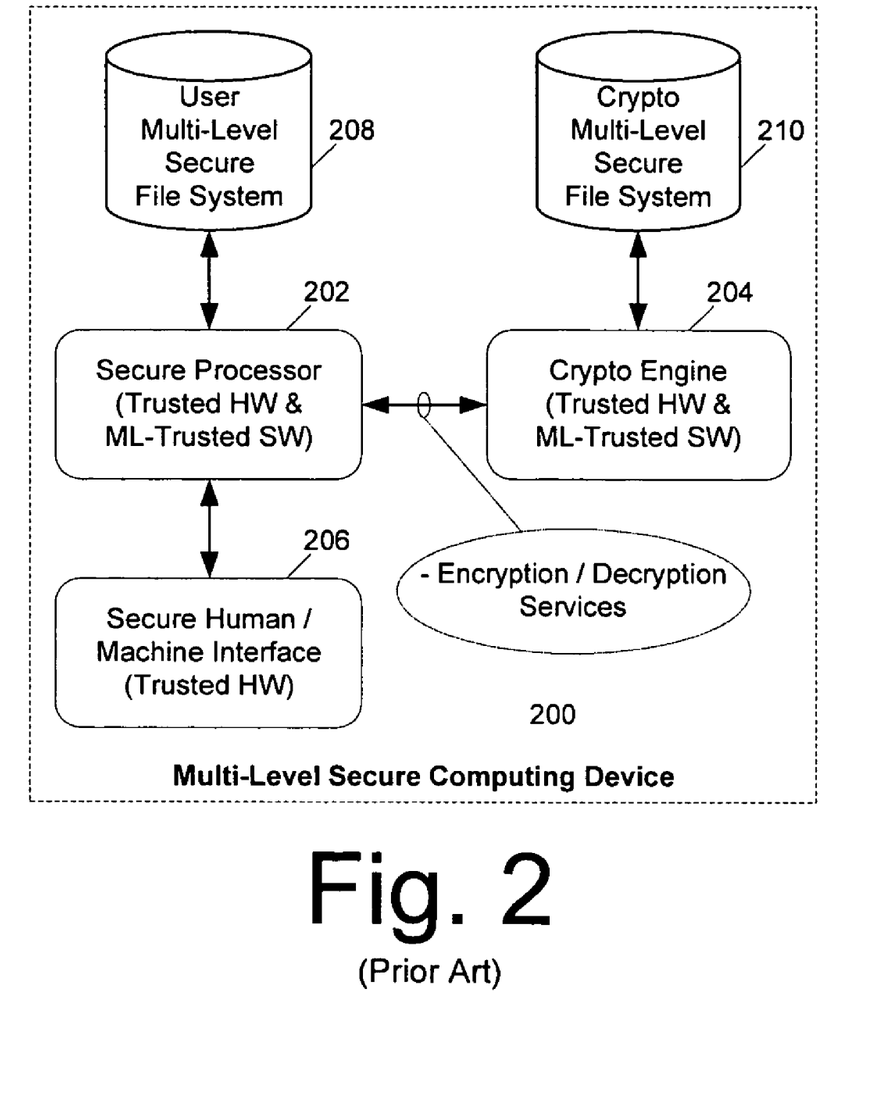
FIG. 2 is a block diagram of a multi-level secure computing device of the prior art.

Referring now to FIG. 2, there is shown a multi-level secure (MLS) computing device 200. MLS computing device 200 can include a secure user processor 202 comprised of trusted hardware and multi-level trusted software (operating system and application software). A secure human/machine interface (HMI) 206 is also provided for the MLS computing device 200. The secure human/machine interface can be similar to the secure HMI described above relative to FIG. 1

The MLS computing device 200 also includes a user MLS file system 208 in a data store that is used for storing user executable programs and data. Classified data stored in the MLS file system 208 is stored in an encrypted format. A cryptographic engine 204 is provided with trusted hardware and multi-level trusted software for providing encryption and decryption services. A crypto MLS file system 210 is used to store classified data and files used by the cryptographic engine 104. For example, the MLS file system can separately store and control access to data that is designated as Classified, Secret, or Top Secret. In contrast to the user MLS file system 208, user data and applications are not generally stored in the crypto MLS file system 210. Instead, the crypto MLS file system 210 generally contains cryptographic algorithms, security keys, and application data that is specific to the processing performed by the cryptographic engine 204.

Encrypted files in the user MLS files system 208 are accessed by the secure user processor 202 and provided to the cryptographic engine 204 for decryption. After the file has been decrypted, the cryptographic engine passes the decrypted file back to the secure user processor 202. Upon completion of any necessary user processing associated with the decrypted classified date file, the secure user processor 202 passes the file back to the cryptographic engine 204 for re-encryption. Thereafter, the encrypted file is returned to the secure user processor 202, which stores the file in the user MLS file system 208.

The secure user processor 202 can generally satisfy the security requirements for accessing the multi-level secure user file system 208. However, the operating system and applications' can be expensive as compared to COTS systems. In particular, the secure user processor must be developed specifically to include trusted software for managing multiple levels of classified files, and especially for managing encryption and decryption services provided by the cryptographic processor. Another disadvantage of this arrangement is that the user multi-level secure user file system 208 is not generally designed to physically secure the data and zeroize the data upon tamper detection.

Figure 3:
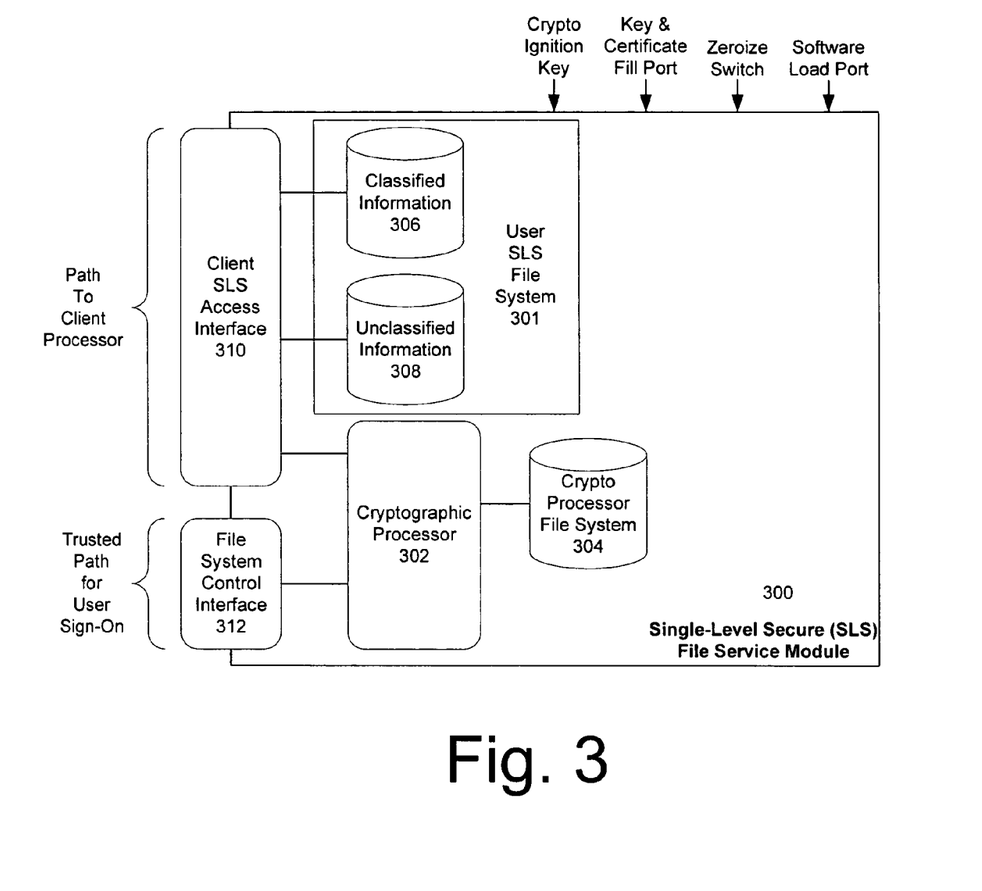
FIG. 3 is a detailed block diagram of a single-level secure file service module.

Referring now to FIG. 3, there is shown a detailed block diagram of a SLS file service module 300. As shown in FIG. 3 the cryptographic engine 302 can host a crypto processor file system 304 and a user SLS file system 301 comprised of classified information 306 and unclassified information 308. The classified information 306 will generally include files comprising classified data and classified applications. The unclassified information 308 can include data generally stored as plain text. For example, the unclassified information 308 can be comprised of unclassified data and unclassified applications. The crypto processor file system 304 provides storage for files used by the cryptographic processor 302. For example, these files can include cryptographic algorithms, keys and certificates, audit data and policy profiles.

The files comprising classified information 306 stored in the user SLS file system can be decrypted by the secure cryptographic processor 302 and served to a client processor using client SLS access interface 310. In the opposite direction, files comprising classified information 306 processed by the client processor are presented through client SLS access interface 310 to the cryptographic processor 302 for encryption. Once encrypted, the the cryptographic processor 302 stores the files in the SLS file system as classified information 306. Consequently, SLS file service module 300 can provide a client processor with unencrypted read/write access to classified information 306 after user authentication.

The files included in the unclassified information 308 stored in the user SLS file system can be read by the secure cryptographic processor 302 and served to the client processor through client SLS access interface 310. Advantageously, the cryptographic processor 302 can limit access by a client processor so that the client processor is permitted read only access to files which contain unclassified information.

An interesting and important aspect of the arrangement in FIG. 3 is that a client SLS processor of the prior art is normally only able to access classified information (at one level). In contrast, a client processor utilizing the SLS file service module disclosed in FIG. 3 is now also able to access unclassified information without the possibility of access violation. This is possible because the client processor only has read access to the unclassified information and is thus unable to accidentally or maliciously modify the unclassified data file in a way that would cause it to contain classified information. For example, this might otherwise occur if the user tried to downgrade the classified information from files containing classified information by writing it unencrypted to the unclassified information storage area. Additionally, the cryptographic processor 302 can also ensure that information loaded into the SLS file system has been provided by a trusted source and that the integrity of the information has been checked. For example, this can be accomplished using checksum/hashing technology.

The cryptographic processor 302 can be one of several commercially available cryptographic engines. According to one embodiment, the cryptographic engine can be a Sierra II Crypto processor available from Harris Corporation of Melbourne, Fla. The cryptographic processor 302 can include configurable key lengths and can be programmed with one or more encryption algorithms. As illustrated in FIG. 3, the SLS file service module can include several control and data ports that are useful for controlling the operation of the cryptographic processor 302. For example, these can include a crypto ignition key port, a key and certificate fill port, a zeroize switch, and a software load port. The software load port can be used for loading software from a trusted source for executing on the cryptographic processor 302 or the client processor. The zeroize switch can be used to clear the encryption keys and/or the classified information contained in the user SLS file system and the crypto file system 304. The various control and data ports can be controlled by the client processor or by any other suitable arrangement.

The cryptographic processor 302 can include one or more security features. For example, in addition to providing secure access to an SLS file system, the cryptographic engine 302 can provide security auditing, security policy enforcement, file integrity checking and/or trusted boot software loading.

A client SLS access interface 310 can provide communications support for a communication path between the SLS file service 300 and the client processor. Any suitable physically-secure data communication path can be used for this purpose. Requests from the client processor for access to files and the decrypted data files can be communicated over this interface. A file system control interface 312 can be provided for user authentication, sign on, and sign off. This interface can provide a trusted communication link with the client processor. However, in an alternative arrangement, this file system control interface 312 can provide communications directly with a secure HMI. For example, this alternative arrangement can be desirable where the client processor operates using non-trusted software and therefore cannot support a trusted path.

Figure 4:
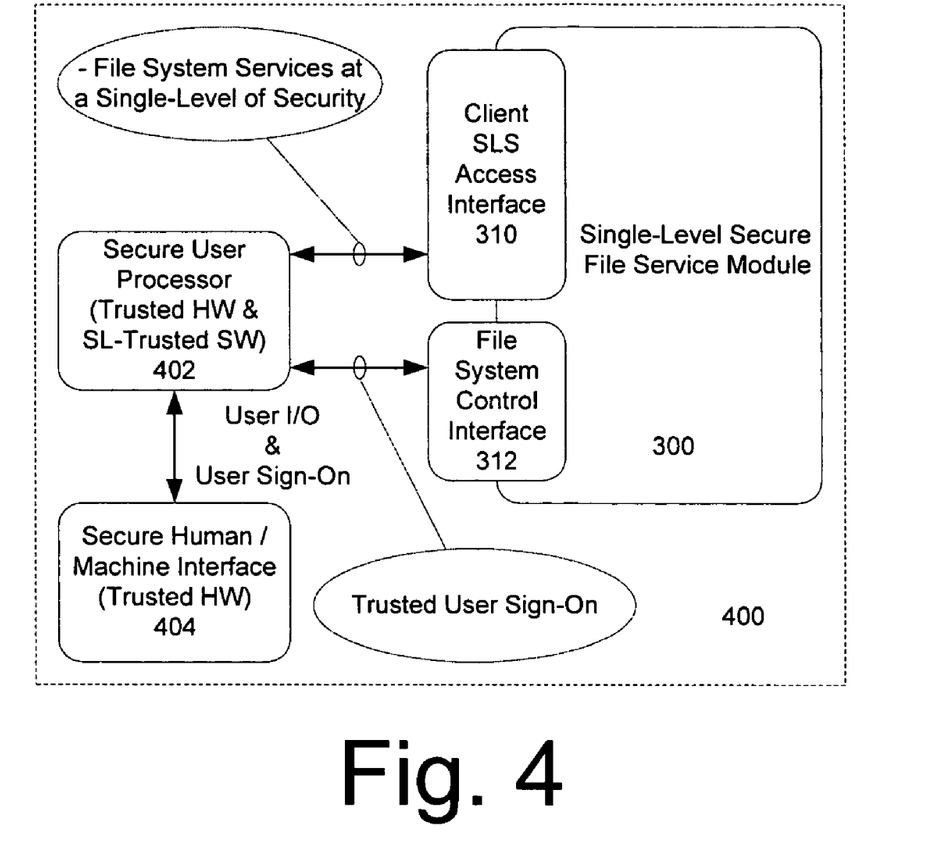
FIG. 4 is a block diagram of a single-level secure computing architecture that utilizes the SLS file service module of FIG. 3.

Referring now to FIG. 4, there is shown a block diagram for one embodiment of a computer architecture for a single-level secure computing device 400 with an embedded single-level secure file service 300 module. SLS computing device 400 includes a secure user processor 402 utilizing trusted processing hardware and single level (SL) trusted software (operating system and application software). A secure HMI 404 is also provided. The secure HMI 404 is comprised of trusted hardware. Secure HMI 404 interfaces with the secure user processor 402 by means of a trusted communication link. Any suitable physically-secure data communication path can be used for this purpose provided that it offers trusted communications between the secure user processor 402 and the secure HMI 404. This trusted communication link can be used for communicating user commands, data, and any information to be displayed on the secure HMI. It can also be used to facilitate user sign-on as hereinafter described.

The secure user processor 402 also communicates with the SLS service module 300. In particular, the secure user processor 402 can communicate with the client SLS access interface 310 and the file system control interface 312. The client SLS access interface 310 provides services as described above. The file system control interface 312 can provide a path for trusted user sign-on and authentication for user access to the SLS file services provided by SLS file service module 300.

The architecture in FIG. 4 provides the same capabilities as the prior art SLS computing device 100 shown in FIG. 1 while overcoming several of its limitations. The single-level trusted software running on secure user processor 402 is much simpler and thus less expensive to design, develop, and test/certify as compared to the SL-trusted software required for the secure processor 102 in computing device 100. The SL-trusted operating system utilized on secure user processor 402 does not need to implement a trusted file system which is normally a significant portion of the SL-trusted OS development effort. The SL-trusted software applications utilized on secure user processor 402 do not need to invoke decryption services upon file read from the file system and do not need to invoke encryption services upon file write to the file system. The absence of these requirements significantly reduces the design, development and testing/certification effort for those software applications. It is noted that although the software executing on secure user processor 402 is simpler and potentially less expensive than the software utilized by the secure user processor 102 in the prior art, the software executing on secure user processor 402 still needs to be designed, developed, and tested/certified to single-level secure standards. The software on secure user processor 402 still needs to be SL-trusted so that it can provide the trusted path to the file system control interface 312 to support trusted user sign-on services.

Figure 5:
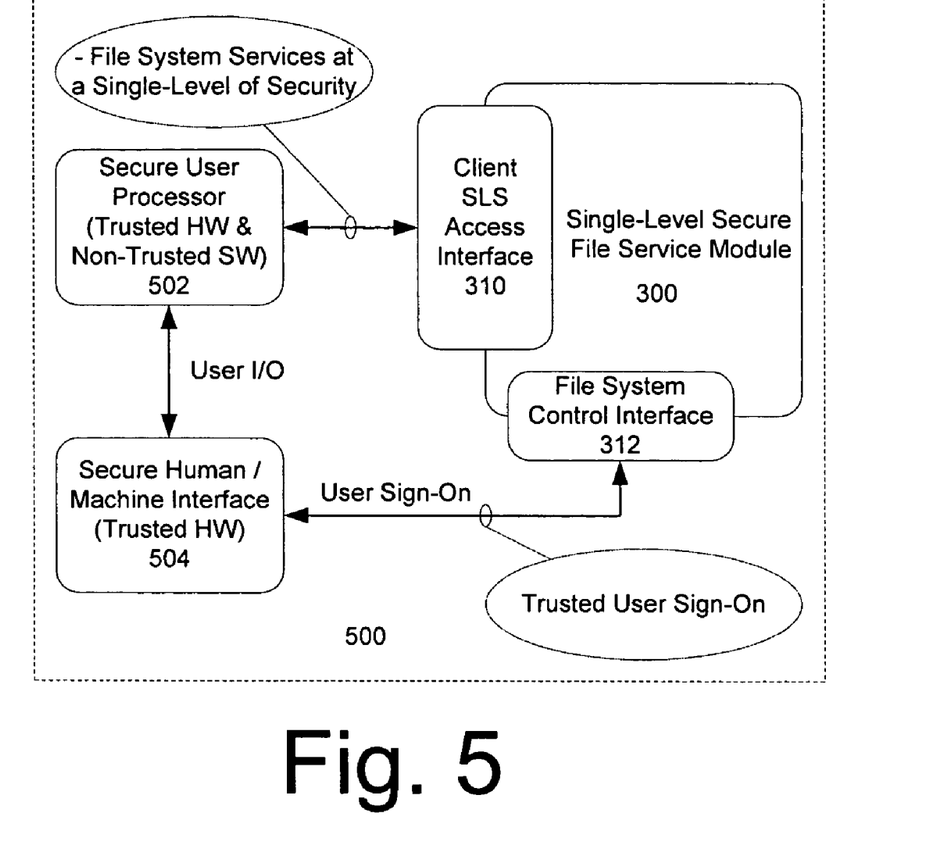
FIG. 5 is an alternative embodiment of a single-level secure computing architecture that utilizes the SLS file service module of FIG. 3.

Referring now to FIG. 5, there is shown a block diagram for another embodiment of a computer architecture for a single-level secure computing device 500 with an embedded single-level secure file service 300 module. SLS computing device 500 includes a secure user processor 502 utilizing trusted processing hardware. However, rather than using SL trusted software, non-trusted software (operating system and application software) is used instead. For example, COTS software can be used for this purpose. A secure HMI 504 is also provided. The secure HMI 504 is comprised of trusted hardware. Secure HMI 504 interfaces with the secure user processor 502 by means of a physically-secure communication link. Any suitable physically-secure data communication path can be used for this purpose. This physically-secure data communication link can be used for communicating user commands, data, and any information to be displayed on the secure HMI. Notably, this physically-secure communication link is not used to facilitate user sign-on. Instead, a separate trusted communication link is provided directly between the secure HMI 504 and the file system control interface 312.

The secure user processor 502 also communicates with the SLS service module 300. In particular, the secure user processor 502 can communicate with the client SLS access interface 310 (but not the file system control interface 312). The client SLS access interface 310 provides services as described above.

The architecture in FIG. 5 provides the same capabilities as the SLS computing device 400 shown in FIG. 4, while overcoming one of its major limitations. In contrast to the device 400, the software running on secure user processor 502 is COTS software that is highly familiar to the user and does not require expensive custom development. The tradeoff to this approach is that secure user processor 502 cannot provide the trusted path to the file system control interface 312 to support trusted user sign-on services. Referring to FIG. 5, it is seen that trusted human/machine interface 504 must now support two separate interfaces, one trusted interface to the SLS file service module 300 to handle user authentication and a second physically-secure interface to secure user processor 502 for all normal user input/output such as running software applications. This can permit a user to use familiar COTS operating systems and applications installed on the secure user processor 502, while still having the benefit of access to classified data by using the SLS file service module 300.

Figure 6:
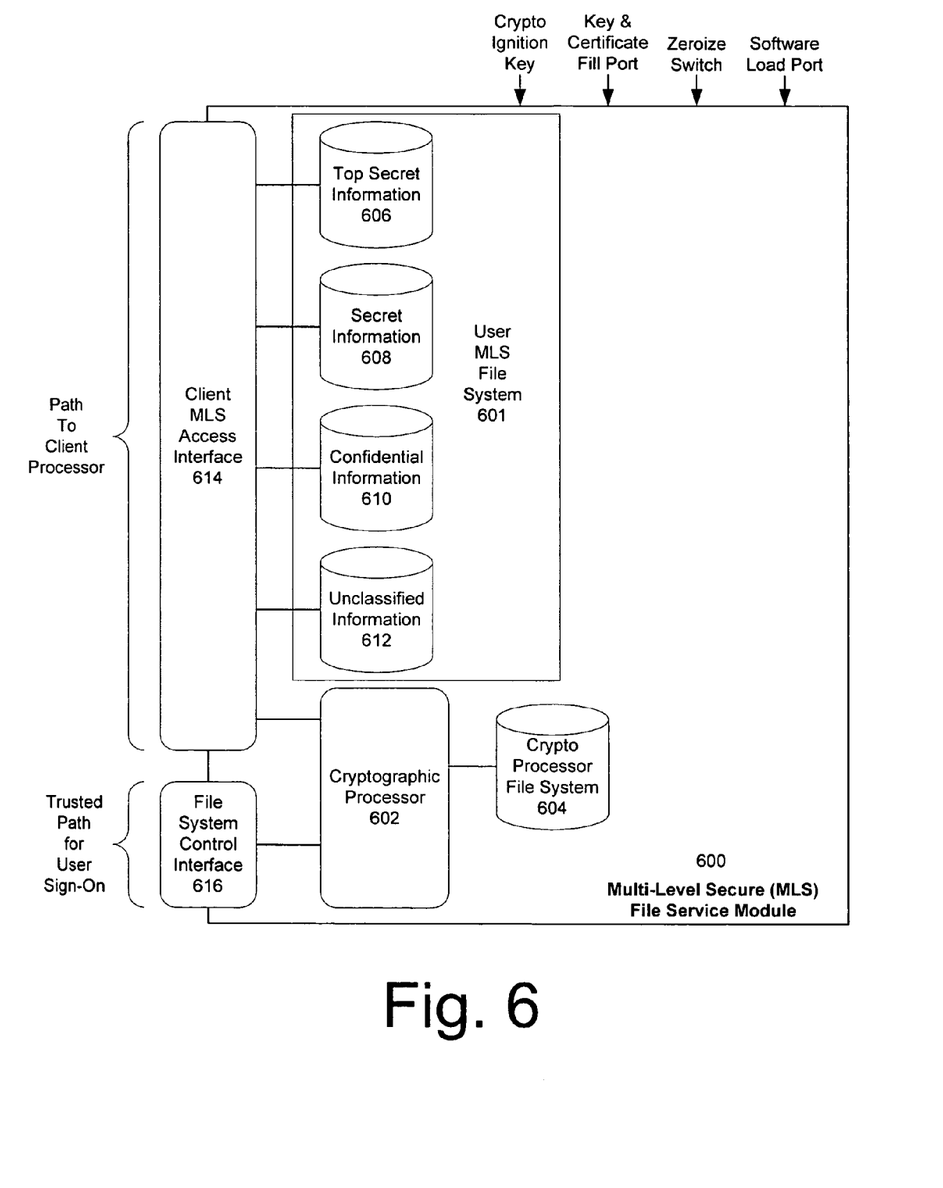
FIG. 6 is a detailed block diagram of a multi-level secure file service module.

Referring now to FIG. 6, there is shown a detailed block diagram of a multi-level secure (MLS) file service module 600. As shown in FIG. 6 the cryptographic processor 602 can host a crypto processor file system 604 and a user MLS file system 601 comprised of classified information at multiple classification levels. The crypto processor file system 604 can provide storage for various file used by the cryptographic processor 604. For example, these files can include cryptographic algorithms, keys and certificates, audit data and policy profiles. In contrast, the user MLS file system 601 is provided for user files at multiple classification levels. The multiple classification levels can include files comprising Top Secret information 606, Secret information 606, and Confidential information 610. The files comprising Top Secret information 606, Secret information 606, and Confidential information 610 are stored in an encrypted form. These files can include classified data and classified applications.

The classified information files stored in the user MLS file system can be decrypted by the secure cryptographic processor 602 and served to a client processor using client MLS access interface 614. In the opposite direction, classified information processed by the client processor is presented by means of client MLS access interface 614 to the cryptographic processor 602. The cryptographic processor 602 encrypts the classified data file and stores it in the classified section of the user MLS file system as Top Secret information 606, Secret information 606, or Confidential information 610. In this way, the MLS file service module 600 can provide a client processor with unencrypted read/write access to such files at a particular security classification level after user authentication. Additionally, the cryptographic processor 602 can ensure that information loaded into the MLS file system has been provided by a trusted source and that the integrity of the information has been checked by using checksum/hashing technology.

The user MLS file system 601 can also contain files comprising unclassified information 612. The files comprising unclassified information 612 stored in the user MLS file system 601 can be read by the secure cryptographic processor 602 and served to the client processor by means of client MLS access interface 614. In the opposite direction, unclassified information processed by the client processor is presented through client MLS access interface 614 to the cryptographic processor 602 for storage in the unclassified section 612 of the user MLS file system. The MLS file service module 600 can provide read/write access to files comprising unclassified information 612.

The cryptographic processor 602 can be one of several commercially available cryptographic engines. According to one embodiment, the cryptographic processor can be a Sierra II Crypto processor available from Harris Corporation of Melbourne, Fla. The cryptographic processor 602 can include configurable key lengths and can be programmed with one or more encryption algorithms. As illustrated in FIG. 6, the MLS file service module 600 can include several control and data ports that are useful for controlling the operation of the cryptographic processor 602. For example, these can include a crypto ignition key port, a key and certificate fill port, a zeroize switch, and a software load port. The software load port can be used for loading software from a trusted source for executing on the cryptographic processor 602 or a client processor. The zeroize switch can be used to clear the encryption keys and/or the classified information contained in the user MLS file system and the crypto MLS file system 604. The various control and data ports can be controlled by the client processor or by any other suitable means.

The cryptographic processor 602 can include one or more security features. For example, in addition to providing secure access to an MLS file system, the cryptographic engine 602 can provide security auditing, security policy enforcement, file integrity checking and/or trusted boot software loading.

The client MLS access interface 614 can provide communications support for a communication path between the MLS file service 600 and a client processor. Any suitable physically-secure data communication path can be used for this purpose. Requests from the client processor for access to files and the decrypted data files can be communicated over this interface. A file system control interface 616 can be provided for user authentication, sign on, and sign off. This interface can provide a trusted communication link with the client processor.

Figure 7:
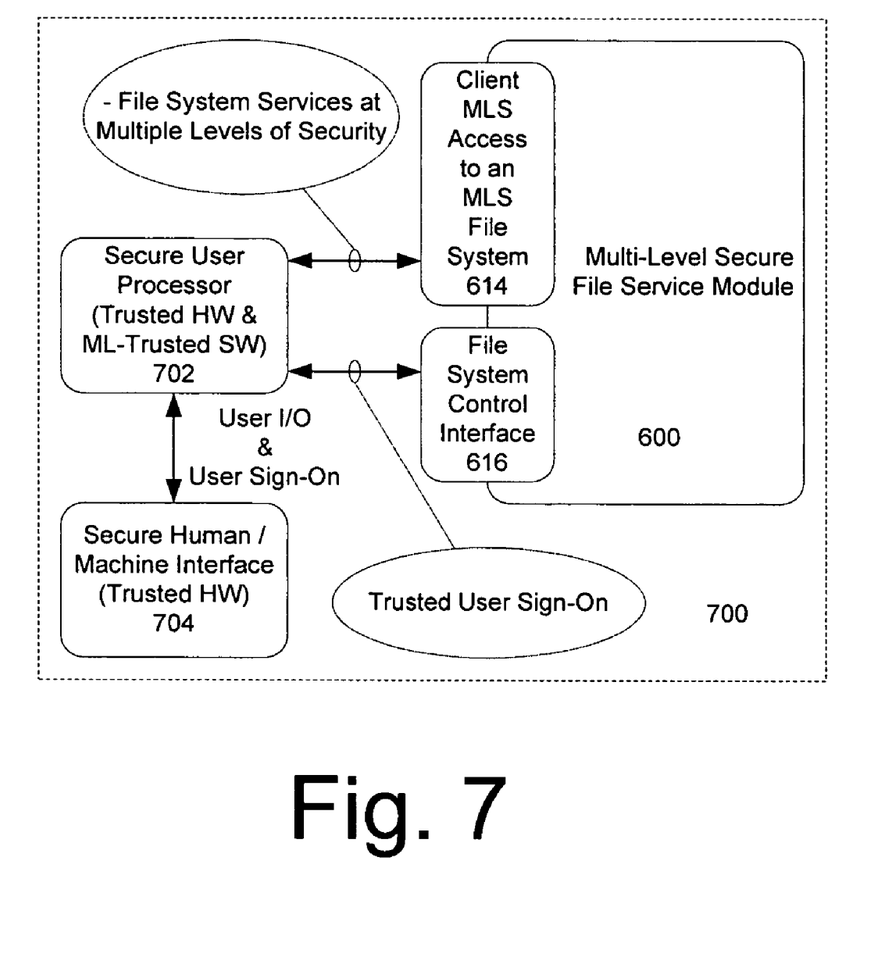
FIG. 7 is a block diagram of a multi-level secure, computing architecture that utilizes the MLS file service module of FIG. 6.

Referring now to FIG. 7, there is shown a block diagram for one embodiment of a computer architecture for a multi-level secure computing device 700 with an embedded multi-level secure file service 600 module. The computing device 700 includes a secure user processor 702 which includes trusted hardware and multi-level trusted software (operating system and application software. A secure HMI 704 is also provided. The secure HMI 704 is comprised of trusted hardware. Secure HMI 704 interfaces with the secure user processor 702 by means of a trusted communication link. Any suitable physically-secure data communication path can be used for this purpose provided that it offers trusted communications between the secure user processor 702 and the secure HMI 704. This trusted communication link can be used for communicating user commands, data, and any information to be displayed on the secure HMI. It can also be used to facilitate user sign-on as hereinafter described.

The secure user processor 702 also communicates with the MLS file service module 600. In particular, the secure user processor 702 can communicate with the client MLS access interface 614 and the file system control interface 616. The client MLS access interface 614 provides services as described above. The file system control interface 616 can provide a path for trusted user sign-on and authentication for user access to the MLS file services provided by MLS file service module 600.

The architecture in FIG. 6 provides the same capabilities as the prior art MLS computing device 200 shown in FIG. 2 while overcoming several of its limitations. The multi-level trusted software running on secure user processor 702 is much simpler and thus less expensive to design, develop, and test/certify. These advantages result because the ML-trusted operating system utilized on secure user processor 702 does not need to implement a trusted file system which is normally a significant portion of the ML-trusted OS development effort. The ML-trusted software applications utilized on secure user processor 702 do not need to invoke decryption services upon file read from the file system. The ML-trusted software application also does not need to invoke encryption services upon file write to the file system. The absence of these requirements significantly reduces the design, development and testing/certification effort for those software applications.

It is noted that although the software executing on secure user processor 702 is simpler and potentially less expensive than the software utilized by the secure user processor 202 in the prior art, the software executing on secure user processor 702 still needs to be designed, developed, and tested/certified to multi-level secure standards. The software on secure user processor 702 still needs to be ML-trusted so that it can provide the trusted path to the file system control interface 616 to support trusted user sign-on services.

Aside from these distinctions, the MLS computing device 700 operates similar to the device 200 as previously described. For example, a user can be authenticated to the cryptographic processor 602 by means of a sign-on process which involves communicating with the secure user processor 702. Such sign on process will also include a user communication with the secure user processor 702 using secure HMI 704. Once authenticated to a particular security level, the user can be permitted to access classified/unclassified files hosted by the MLS file service module 600.

In FIGS. 4, 5 and 7 a communication link is provided respectively between the secure user processor 402, 502, 702 and an access interface associated with a file system cryptographic processor 302, 602. It should be understood that the foregoing communication link can be implemented by any suitable means and in different physical configurations provided it is physically secure. For example, the data communication link can be through a direct connection (e.g. USB, PCMCIA) interface. Such a direct connection can create the appearance that the file service module 300, 700 is a local disk drive. However, in order to establish a trusted path for user sign-on/sign-off, suitable trusted path methods can be used to provide the communication link. Trusted path methods of this type are well known to those skilled in the art.

As an alternative to the direct connection approach described above, the file service module 300, 600 can be embedded in the computer on an I/O bus (e.g. PCI) to provide the appearance of a local disk drive, but within the same physically secure enclosure. In this way, a secure path can be provided between the secure user processor and the file service module. Yet another alternative can include embedding the file service module 300, 600 on a host computer motherboard. Consequently, the data communication can occur over a data communication link within the same physically secure enclosure to establish a secure path.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims

We claim:

1. A method for providing a secure file service, comprising:
providing a computer system for operation in an unsecure environment, said computer system comprising a secure file services module and a secure user processor which is separate and distinct from said secure file services module, each configured to secure data contained therein wherein said secure file services module and said secure user processor are embodied on the same computing device;
providing first and second secure communication paths in said unsecure environment directly between said secure file services module and said secure user processor, said first secure communication path being separate from said second secure communication path and configured to physically secure data communicated thereover by employing physically secure communication path hardware, said second secure communication path configured to exclusively support user sign-on services and to only software secure data communicated thereover;
communicating an authentication request to said secure file services module over said second secure communication path, said secure file services module including a file system control interface, a client access interface, a cryptographic processor and a secure file system hosted by said cryptographic processor;
providing an authentication of said user using said file system control interface;
communicating to said client access interface over said first secure communication path a request from said secure user processor for a classified data file;
responsive to said request, accessing said secure file system containing said classified data file;
decrypting said classified data file with said cryptographic processor;
and communicating said classified data file to said secure user processor in decrypted form through said first secure communication path.

2. The method according to claim 1, further comprising selecting said cryptographic processor to include one or more hardware based encryption services that facilitate the encryption and decryption of classified data files.

3. The method according to claim 2, further comprising selecting said hardware based encryption services from the group consisting of a hardware implemented cryptographic algorithm, a random number generator, and an exponentiator.

4. The method according to claim 1, further comprising selecting said secure file system from the group consisting of a single-level secure file system and a multi-level secure file system.

5. The method according to claim 1, further comprising generating said request for said classified data file at a secure human/machine interface and communicating said request to said secure user processor.

6. The method according to claim 1, further comprising, displaying information contained in said classified data file to a user with a secure human/machine interface.

7. The method according to claim 1, further comprising:
communicating said classified data file from said secure user processor to said client access interface through said first secure communication path;
encrypting said classified data file using said cryptographic processor; and
accessing said secure file system with said cryptographic processor to store said classified data file after encryption in said secure file system.

8. The method according to claim 1, wherein said communication of said authentication request further includes communicating at least one user authentication information to said cryptographic processor.

9. The method according to claim 1, further comprising:
receiving at said client access interface a request from said secure user processor for a non-encrypted unclassified data file;
responsive to said request, accessing with said cryptographic processor a secure file system containing said unclassified data file; and
communicating said unclassified data file to said secure user processor through said first secure communication path in plain-text form.

10. The method according to claim 1, further comprising selecting said cryptographic processor to include a trusted microprocessor and a trusted operating system executing on said trusted cryptographic processor.

11. The method according to claim 1, further comprising selecting said secure user processor to include a trusted microprocessor hardware.

12. The method according to claim 11, further comprising selecting said secure user processor to include a trusted operating system.

13. The method according to claim 11, further comprising selecting said secure user processor to include an untrusted operating system.

14. A system for providing a secure file service, comprising:
a computer system comprising a secure user processor configured to secure data contained
therein wherein said secure file services module and said secure user processor are embodied on the same computing device;
a secure file services module communicatively coupled to said computer system and comprising:
a cryptographic processor comprising means for encrypting and decrypting a classified data file; and
a secure file system hosted by said cryptographic processor containing classified data files stored in a classified information storage area thereof and unclassified data files stored in an unclassified information storage area thereof, said secure file system accessible exclusively to said cryptographic processor; and first and second secure communication paths provided directly between said secure file services module and said secure user processor, said first secure communication path being separate from said second secure communication path and configured to physically secure data communicated thereover by employing physically secure communication path hardware: said second secure communication path configured to exclusively support user sign-on services and to only software secure data communicated thereover;
wherein said cryptographic processor comprises a processing device responsive to said secure user processor distinct from said cryptographic processor for accessing at least one classified data file from said secure file system, decrypting said classified data file, communicating, from said cryptographic processor, said classified data file to said secure user processor in decrypted form, wherein said cryptographic processor is configured to prevent classified information of said classified data file from being written to said unclassified information storage area of said secure file system.

15. The system according to claim 14, wherein said cryptographic processor further comprises one or more hardware based encryption services that facilitate the encryption and decryption of classified data files.

16. The system according to claim 15, wherein said hardware based encryption services are selected from the group consisting of a hardware implemented cryptographic algorithm, a random number generator, and an exponentiator.

17. The system according to claim 14, wherein said secure file system is a single-level secure file system.

18. The system according to claim 14, further comprising a secure human/machine interface operatively connected to said secure user processor configured for communicating user commands to said secure user processor and for displaying classified data files.

19. The system according to claim 14, wherein said secure user processor further comprises processing means for communicating said classified data file from said secure user processor to said cryptographic processor.

20. The system according to claim 19, wherein said cryptographic processor further comprises processing means for encrypting said classified data file, and for accessing said secure file system with said cryptographic processor to store said classified data file after encryption in said secure file system.

21. The system according to claim 14, wherein at least one of said secure user processor and said cryptographic processor further comprises processing means for authenticating a user responsive to at least one user authentication information.

22. The system according to claim 14, wherein said cryptographic processor further comprises means for accessing a secure data file system responsive to a request from said secure user processor for an unclassified plain-text data file, and means for serving said unclassified data file to said secure user processor.

23. The system according to claim 14, wherein said cryptographic processor is comprised of a trusted microprocessor and a trusted operating system executing on said trusted cryptographic processor.

24. The system according to claim 14, wherein said secure user processor include a trusted microprocessor hardware.

25. The system according to claim 24, wherein said secure user processor is comprised of a trusted operating system.

26. The system according to claim 24, wherein said secure user processor comprises an untrusted operating system.

27. A system for providing a secure file service, comprising:
a secure file services module including
a cryptographic processor,
a cryptographic processor file system hosted by said cryptographic processor providing storage for files used exclusively by said cryptographic processor,
a secure file system hosted by said cryptographic processor wherein said secure the services module and said secure user processor are embodied on the same computing device, said secure file system
including a classified information storage area and an unclassified information storage area,
a client access interface configured to serve classified files stored in said secure file system to a client processor after decryption by said cryptographic processor, to receive classified files from said client processor, and to store said classified files in said secure file
system after encryption by said cryptographic processor, said client access interface comprising a first secure communication path directly between said secure file services module and said client processor that is configured to physically secure data communicated therethrough by employing physically secure communication path hardware, and
a file system control interface communicating with said cryptographic processor and, configured for authenticating a user prior to said client access interface serving classified files to said client processor, said file system control interface comprising a second secure communication path directly between said secure file services module and said client processor that is separate from said first secure communication path, said second secure communication path configured to exclusively support user sign-on services and to only software secure data communicated thereover.

28. The system according to claim 27, wherein said secure file system is a single level secure file system.

29. The system according to claim 28, wherein said client access interface provides said client processor with read only access to said unclassified information.

30. The system according to claim 28, wherein said client processor is comprised of trusted hardware and untrusted software.

31. The system according to claim 30, further comprising a human/machine interface comprised of trusted hardware which interfaces with the client processor over a physically secure data communication path.

* * * * *